United States Patent

[11] 3,617,306

[72] Inventors Seymour Pomper
 Stamford, Conn.;
 Emanuel Akerman, Bronx, N.Y.
[21] Appl. No. 4,419
[22] Filed Jan. 20, 1970
[45] Patented Nov. 2, 1971
[73] Assignee Standard Brands Incorporated
 New York, N.Y.
 Continuation-in-part of application Ser. No. 579,218, Sept. 14, 1966, now abandoned

[54] PROPAGATION OF YEAST
 8 Claims, No Drawings
[52] U.S. Cl. .................................................... 99/96, 195/82
[51] Int. Cl. ....................................................... A23j 1/18
[50] Field of Search ............................................. 99/96; 195/74, 82, 98

[56] References Cited
 UNITED STATES PATENTS
 1,727,847 9/1929 White ........................... 99/96
 2,919,194 12/1959 Johnston ....................... 195/98 X Primary Examiner—Lionel M. Shapiro
Assistant Examiner—D. M. Naff
Attorneys—Aaron B. Karas and William Koenen ABSTRACT: Yeast is propagated in the presence of an effective amount of a nonnutritive ionizable salt sufficient to impart to the yeast superior leavening activity in sweet dough. Examples of nonnutritive salts are NaCl, $Na_2SO_4$, NaBr, $Na_2CO_3$, Na acetate, and $SrCl_2$.

PROPAGATION OF YEAST

This application is a continuation-in-part of application Ser. No. 579,218 filed Sept. 14, 1966 and now abandoned.

This invention relates to a process for preparing yeast products. Particularly, the present invention relates to a process of producing compressed and active dry yeast products having improved leavening activity.

Commercial yeast today is supplied to bakeries and consumer in two forms, i.e., active dry and compressed. Compressed yeast is produced by steps well known in the art involving centrifuging and filtering freshly propagated yeast of a highly active but metabolically sensitive strain to provide products containing about 70 percent moisture.

The selection of the culture of the yeast to be propagated depends upon whether a compressed yeast or active dry yeast is to be produced. The cultures usually employed for baking uses are of two distinct types when classified according to the bios response procedure published by Schultz and Atkin in "Archives of Biochemistry" vol. 14, p. 369 (Aug. 1947). The first type culture is classified as Bios No. 236. This type is generally used when it is desirable to produce a compressed yeast product. The second type culture, Bios No. 23, is generally used when an active dry yeast is to be produced. Although yeast of the Bios No. 23 type can be propagated to higher yields and is hardier and metabolically more stable than yeast of the Bios No. 236 type, the latter type is preferred by commercial bakers because of its superior leavening activity.

In commercial processes for propagating yeast, it is common practice to proceed by stages. Generally, propagation is started by inoculating yeast into a presterilized nutrient medium usually contained in a shaker flask. In the flask, growth of the yeast is encouraged by various means, e.g., shaking for aeration and maintenance of suitable temperature. The yeast is removed from the flask and inoculated into another flask containing a larger volume of nutrient medium and growth of the yeast induced. These initial stages may conveniently be referred to as flask or cultural development stages. From these stages, the yeast may be inoculated into a vessel having an air source and means of agitation. These steps or stages may be repeated once or twice using greater amounts of nutrient medium and larger vessels. Because the amount of air used in these stages is generally restricted, these stages are commonly referred to as slightly aerobic stages. Yeast from these stages is then transferred into larger fermentors where vigorous growth conditions are maintained, including the use of large volumes of air. These stages may be referred to as highly aerobic or commercial stages since the yeast from these stages is harvested and processed for bakery use.

After propagation of the yeast it is separated from the other constituents of the growth media, washed and centrifuged several times. This yeast is known in the art as cream yeast. The cream yeast may be transferred to a filter where a relatively large quantity of its extracellular water is removed. This yeast is known in the art as compressed yeast and contains about 30 percent yeast solids. Generally, this is the form of yeast that is supplied to commercial bakeries. Active dry yeast may be produced from a suitable compressed yeast by any of the several processes known in the art, for example, by the use of a process known as the "spaghetti process." This process involves extruding a suitable compressed yeast in spaghetti form and drying it under controlled conditions on a moving belt.

Active dry yeast is a yeast composition containing up to 10 percent moisture and generally from 5 to 8 percent moisture. Yeast of the Bios No. 23 type is usually selected for the production of active dry yeast because, as mentioned above, it is hardier and metabolically more stable than Bios No. 236 and accordingly can be dried to low moisture levels with minimal loss of its initial leavening activity occurring. It is the practice during the propagation of yeast which is to be dried, for instance by the "spaghetti process," to restrict the nitrogen and phosphorus intake of the yeast and thereby produce a yeast which is of a relatively reduced protein and phosphorus content. The restriction of nitrogen and phosphorus, although reducing the leavening activity of the yeast, will, however, impart to the yeast a drying tolerance which enables it to be dried to low moisture levels without greatly affecting its initial leavening activity. The protein content of such yeast is generally in the range of about 37 to 43 percent, on a yeast solids basis, and the phosphorus content is generally in the range of about 1.65 to 2.25 percent calculated as $P_2O_5$ on the same basis. In the case of compressed yeast, which is not propagated under reduced nitrogen and phosphorus conditions, the protein content is generally in the range of 47 to 55 percent on a yeast solids basis, and the phosphorus content is generally in the range of about 2.5 to 3.5 percent calculated as $P_2O_5$ on the same basis.

It is an object of the present invention to propagate yeast under conditions which produce a yeast with superior leavening activity.

Another object of the present invention is to produce a superior active dry yeast product containing a relatively high protein and phosphorus content.

These objects as well as other objects will be apparent from the following description are achieved in accordance with the present invention by propagating yeast in stages and harvesting the yeast from the last stage, there being present in the last stage an effective amount of a nonnutritive ionizable salt sufficient to impart to the yeast superior leavening activity in sweet dough but insufficient to substantially lessen the amount of yeast harvested as compared to the amount of yeast harvested from propagating the yeast without the presence of the salt.

The term "sweet dough" as used herein is a dough formulation containing between about 15 and 25 percent and preferably about 20 percent sucrose by weight of the flour. While the level and type of the nonnutritive salt are measured in terms of its effect on the leavening activity in sweet dough, it should be understood, however, that yeast produced by the method of the present invention may show improved leavening activity in other dough formulations.

Nonnutritive salt is herein defined as a salt whose absence during the propagation of the yeast does not affect the yield of the yeast. This is distinguished from nutritive salts such as certain ammonium salts like phosphates, sulfates, nitrates, etc., and other phosphate salts whose presence at particular levels during the propagation of the yeast directly affect the yield and which supply some necessary ingredient for the growth of the yeast like ammonium and phosphate ions. Of course, the ingredients commonly used in yeast propagation will contain trace quantities of nonnutritive ionizable salts as do most natural substances but such quantities are not the "sufficient amount" needed to impart to the yeast the superior leavening activities in sweet dough as contemplated by the present invention.

Another aspect of the present invention is that an active dry yeast product, for instance, yeast of the Bios 23 type, may be produced with a relatively high phosphorus and protein content and have good leavening activity. For example, the active dry yeast may have a phosphorus content above about 2.5 percent calculated as $P_2O_5$ and a protein content above about 45 percent, the percentages being based on the yeast solids. Thus, such yeast can be propagated at higher nitrogen and phosphorus intake levels, and the propagated yeast will have essentially the same drying tolerance as conventionally propagated yeast but better leavening activity. Additionally, active dry yeast products which have been propagated in the presence of a nonnutritive salt may show improved storage stability and cool water tolerance. Cool water tolerance is a measure of a dry yeast's leavening activity after it has been rehydrated in cool water; for instance, in water at 70° F.

In the case of propagating yeast for use as compressed yeast, for instance, yeast of the Bios 236 type, the process of the present invention improves the leavening activity of such compressed yeast over that of conventional compressed yeast. Also, when the compressed yeast is propagated under conditions to restrict its nitrogen and phosphorus intake the sale in some manner unexpectedly imparts to the yeast a drying tolerance so that it may be dried to low moisture levels with less loss of leavening activity than is the case with compressed yeast which is not so propagated. If salt is not used during propagation, the compressed-type yeast cannot be dried to provide a commercially acceptable product even when its nitrogen and phosphorus intake are restricted.

In the production of sponge dough bread, e.g., many brands of commercial white bread, the only dry yeast presently available commercially is the yeast commonly referred to as active dry yeast. However, this yeast does not perform as well in the production of such bread as does compressed yeast. Thus, for the production of sponge dough breads, most bakers use compressed yeast because of its superior properties for such purposes. However, compressed yeast has the disadvantage of shorter shelf life than active dry yeast. By the method of the present invention, it is possible to dry yeast of the compressed type, i.e., Bios 236, and produce a dry yeast which has greater shelf life and good leavening activity in sponge doughs.

Various classes of nonnutritive ionizable salts have been found to be particularly satisfactory; for example, salts where the cation thereof is an alkali or alkaline earth metal. Exemplary of such salts are NaCl, $Na_2SO_4$, NaBr, $Na_2CO_3$, Na acetate, and $SrCl_2$. The use of other classes of salts are contemplated as coming within the scope of the present invention and their effect on the yeast can be readily ascertained by a man skilled in the art by propagating yeast in the presence of such salts, harvesting such yeasts and comparing the leavening activity of the compressed or active dry yeast, as the case may be, to the leavening activity of conventionally propagated compressed or active dry yeast.

The amount of nonnutritive salt used in the process of the present invention may vary somewhat depending upon whether it is used in one propagation stage or in a number of the propagation stages. To achieve the benefits hereinabove described it is necessary only to propagate the yeast with a nonnutritive salt in the last stage. In the case of NaCl it has been found that as little as 0.1 percent by weight based on the volume of the final propagation medium or mash volume will show a desirable result. Preferably from about 0.3 to about 1.0 percent NaCl is used, and in the case of propagating a yeast which is to be dried from about 0.3 to about 0.6 percent, and in the case of propagating yeast which is to be used in compressed form from about 0.5 to about 0.9 percent. When a nonnutritive salt is used in the final stage and in the preceding stages smaller amounts thereof must be used if the amount of the yeast harvested is not to be deleteriously affected. For example, if 0.5 percent or as little as 0.3 percent NaCl is used in each of the successive stages, the final yield of the yeast may be decreased by about 10 percent and in some cases by even a greater amount. If a nonnutritive salt is present in the successive stages of yeast propagation it should be present in the stage preceding the final stage in an amount of less than about 0.2 percent and preferably less than 0.1 percent. Having salt present in successive stages of the propagation of yeast shows no beneficial results that could not be achieved by having a salt present in only the last stage. Therefore, it is preferred to carry out the method of the present invention by using salt in only the last stage. When salts other than NaCl are employed, satisfactory results are generally obtained at levels corresponding to the levels given above for NaCl, the levels being based on gram atomic equivalents of the sodium in NaCl.

Although the present invention has been primarily described with respect to the production of compressed yeast or active dry yeast of various types with superior leavening activity, it is contemplated as coming within the scope of the present invention that other types and forms of yeast may be produced according to this process.

The nonnutritive salt may be provided in the propagation medium by adding it incrementally during the propagation or all at once at the start of a propagation stage.

The improvements imparted to yeast when propagated in the presence of a nonnutritive, ionizable salt are surprising in view of the general knowledge in the art that such salts in some instances are harmful to yeast and are used to actually slow down the fermentation of yeast in dough formulations so that fermentation will proceed at a relatively slow and controlled rate.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout the specifications, percentages refer to percent by weight based on the volume of the propagation medium or mash.

EXAMPLE I

This example illustrates the use of NaCl in the propagation of yeast of the Bios No. 23 type and its effect on the leavening activity of active dry yeast products made therefrom.

The propagation was carried out according to commercial practice typified by the process described by Frederic W. Nordsiek in FOOD ENGINEERING, McGraw Hill Publishing Co., N.Y., N.Y., May 1951, and more specifically in the following manner:

1. A total of 500 grams of 80° Balling molasses was used during the entire propagation cycle.
2. A sufficient amount of NaCl was dissolved in about 3 liters of water to achieve a level of about 0.34 percent by weight based on the volume of the propagation medium. This was followed by the addition of 1.3 mg. percent thiamine hydrochloride in 5 ml. volume of water and a small portion of the molasses.
3. 5.13 percent by weight, based on the volume of the propagation medium, of the stock yeast (30 percent solids) Bios No. 23, prepared according to commercial practice, was added slowly in cream yeast form.
4. Aeration at 8.5 c.f.m. was started.
5. Feed of molasses, ammonium ion, and phosphorus was started. 0.37 percent of aqua ammonia and 0.06 percent technical grade phosphoric acid were used.
6. After about 12 hours, the wort was separated from the yeast cells by centrifugation.
7. The yeast cells were washed twice using about 0.8 gallons of water each time containing a total of 0.64 percent NaCl based on final mash volume.

The NaCl was used in only the last propagation stage.

A control yeast was propagated in a manner similar to the procedure above except that no NaCl was used.

The NaCl-treated yeast and the control were vacuum filtered and pressed to form yeast cakes containing about 30 percent solids and the cakes extruded into spaghetti form and dried in a temperature range from 95° to 120° F. and at a relative humidity of from about 70 to about 10 percent until the products reached the desired moisture level. Portions of the dried products were rehydrated in water at 100° F. and 70° F. and checked for leavening activity in sweet dough. Other portions of the dried products were stored at an elevated temperature and checked for their storage stability as measured by their leavening activity in sweet dough. The storage tests used in the examples, comprised in the case of active dry yeast, storing the yeast for 96 hours at 115° F. in air and then checking for leavening activity, and in the case of compressed yeast storing the yeast for 72 hours at 77° F. and then checking for leavening activity. Leavening activity of the yeast was determined by means of sweet dough punch tests.

The longer the time required for the sweet dough to reach the predetermined volume the poorer the leavening activity of the yeast.

TABLE I

| Sample | Percent moisture | Rise time (minutes) | | Leavening activity after storage* |
|---|---|---|---|---|
| | | Rehydrated at 100° F. | Rehydrated at 70° F. | |
| Control | 8.1 | 76-62 | 95-72 | 95-81 |
| Salt treated | 8.3 | 73-55 | 87-62 | 86-69 |

*Rehydrated in water at 100° F.

The results shown in the above table indicate that yeast propagated in the presence of NaCl and washed with an NaCl solution has a better initial leavening activity, cool water tolerance, and storage stability than yeast handled in the same manner but without NaCl treatment.

EXAMPLE II

This example illustrates the use of NaCl in the propagation of yeast of the Bios No. 236 type and its effect on the leavening activity of active dry yeast made from such propagated yeast.

The propagation was similar to that described in example I, except for the following:
1. 0.64 percent by weight NaCl based on the final volume of the mash was used at the start.
2. About 2.61 percent stock yeast was used.
3. A total of 0.48 percent ammonia and 0.07 percent phosphoric acid was used.
4. The yeast cells were washed only once with a gallon of water containing 0.45 percent NaCl.
5. About 7.0 c.f.m. of air was used.

NaCl was used in only the final propagation stage in this example.

A control yeast was propagated in a manner similar to the procedure above except that no NaCl was used. The control and the NaCl-treated yeast were dried in the manner outlined in example I. The leavening activities of the NaCl-treated yeast and the control, initially, and after storage, were tested in sweet dough and sponge dough. The testing consisted of measuring the time required for the yeast to ferment a sugarless dough, commonly referred to as sponge time, to a predetermined volume and then punching the dough down and incorporating therewith sugar, and then measuring the time required for the dough to reach a predetermined volume. This test is referred to as a sponge dough punch. In the sweet dough test, the same procedure was used as in example I, except that the time required for the dough to rise in a predetermined volume for a third time was measured. Throughout this example and the remaining examples, the dried yeast products were rehydrated in water at 100° F. unless otherwise noted.

TABLE II

| Sample | Pescent moisture | Sweet dough punch, rise time (min.) | | Sponge dough punch, rise time (min.) | |
|---|---|---|---|---|---|
| | | Initial | After storage | Initial | After storage |
| Control | 8.4 | 105-50-39 | 153-76-63 | 69-57 | 93-65 |
| Salt treated | 8.9 | 82-41-34 | 120-62-49 | 66-51 | 86-55 |

The results in table II show that yeast of the Bios No. 236 type, when treated with NaCl according to the process of the present invention, can be dried according to the "spaghetti process" and result in an active dry yeast product with excellent leavening activity.

EXAMPLE III

This example illustrates the use of NaCl in the propagation of yeast of the Bios No. 236 type and its effect on the leavening activity of compressed yeast made therefrom.

The yeast was propagated and harvested in the manner outlined in example II, except a total of 0.85 percent NH₃ and 0.13 percent phosphoric acid were used during the propagation. After harvesting the yeast was washed with 1 gallon of water containing 0.68 percent NaCl. The yeast was then filtered and pressed to a 30 percent solids level and tested for leavening activity both initially and after storage in sweet doughs and the results compared to a yeast propagated under similar conditions but without the NaCl treatment of the present invention. The results of the tests are shown below in table III.

TABLE III

| | Rise Time (min.) | |
|---|---|---|
| Sample | Initial | After Storage |
| Control | 89-45-39 | 121-63-51 |
| Salt treated | 72-41-32 | 106-53-47 |

The above results indicate that compressed yeast propagated and treated according to the process of the present invention is superior in leavening activity to conventionally propagated yeast.

EXAMPLE IV

This example illustrates the use of NaCl in the propagation of yeast of the Bios No. 23 type and its effect on the leavening activity of compressed yeast made therefrom.

The yeast was propagated and harvested in the manner outlined in example III, except that a total of 0.51 percent by weight of NaCl based on the final volume of the mash was used in the propagation medium, and a total of 0.90 percent of NH₃ and 0.14 percent phosphoric acid were used. The aeration was at a rate of 6 c.f.m. After harvesting, the yeast was filtered, pressed to 30 percent solids and tested for initial leavening activity and leavening activity after storage in sweet doughs. Table IV below shows the results of these tests and compares these results with the leavening activity of yeast propagated under similar conditions, but without NaCl treatment.

TABLE IV

| | Rise Time (min.) | |
|---|---|---|
| Sample | Initial Activity | Activity After Storage |
| Control | 85-41-34 | 118-51-43 |
| Salt treated | 63-37-31 | 86-43-37 |

EXAMPLE V

This example illustrates the use of NaCl at various levels of concentration in the propagation of yeast of the Bios No. 23 type and the effect of such levels on the leavening activity of active dry yeast made from such propagated yeast.

The yeast was propagated, harvested and dried in the manner outlined in example I. The leavening activity of the NaCl-treated yeast products were compared to a control product made in a similar manner but without being salt treated. The results of the tests are given below in table V.

TABLE V

| Sample | Percent Moisture | Rise Time (min.) |
|---|---|---|
| Control | 7.3 | 79-64 |
| 0.22 percent salt by volume | 7.2 | 76-60 |
| 0.34 percent salt by volume | 7.5 | 72-58 |

EXAMPLE VI

This example illustrates the incremental addition of NaCl during yeast propagation and the effect of such incorporation on active dry yeast made from such propagated yeast.

Sufficient NaCl was incorporated into the propagation medium to achieve a salt level of 0.34 percent in the propagation medium. The salt was added before the stock yeast was added, after the stock yeast was added, and in the molasses zulauf. In the case of the NaCl being added in the molasses zulauf, the salt was dissolved in all the molasses and the molasses slowly zulaufed into the mash over a period of about 11 hours. The yeast was propagated in a manner similar to example I, except for varying the point at which the salt was incorporated into the propagation medium. The yeast products were dried in the manner outlined in example I and tested for leavening activity both initially and after storage in sweet doughs. The results of the tests are given below in table VI.

TABLE VI

| Sample | Percent Moisture | Rise Time (min.) Initial | After Storage |
|---|---|---|---|
| Control | 8.0 | 79–62 | 105–87 |
| Salt added before stock yeast | 7.9 | 75–59 | 87–69 |
| Salt added after stock yeast | 7.8 | 73–55 | 88–68 |
| Salt added in molasses | 8.1 | 72–57 | 87–68 |

EXAMPLE VII

This example illustrates the effect of NaCl wash on the leavening activity of the yeast, after it has been harvested.

Yeast was propagated according to example I, except no NaCl was present during the propagation of the yeast and the yeast after being separated from the spent wort was washed with 1.7 gallons of water containing 0.68 percent NaCl. The leavening activity of active dry yeast was made from such treated yeast both initially and after storage was tested in sweet dough and compared to active dry yeast which was propagated in the presence of NaCl and washed with NaCl, and with a control yeast product which was prepared without any NaCl treatment. The results of the tests are given below in table VII.

TABLE VII

| Sample | Percent Moisture | Initial Activity | Rise Time (min.) Activity After Storage |
|---|---|---|---|
| Control | 7.8 | 83–64 | 103–83 |
| Yeast washed with a salt solution | 7.7 | 84–60 | 94–71 |
| Yeast propagated in the presence of salt and washed with a salt solution | 7.8 | 74–55 | 92–67 |

As seen from the results above, yeast washed with a salt solution has better leavening activity than a control which was not subjected to a salt wash. On the other hand, yeast which is propagated in the presence of salt and washed with a salt solution has better leavening activity than either of the other products.

EXAMPLE VIII

This example illustrates the use of various salts in the propagation of yeast of the Bios No. 236 type and their effect on the leavening activity of compressed yeast made therefrom.

The propagation and harvesting of the yeast was carried out in a manner similar to example 1, except about 2.61 percent stock yeast was used and a total of 0.90 percent ammonia and 0.14 percent phosphoric acid was added. The aeration was at a rate of 7 c.f.m. The yeast samples were propagated with various salts and amounts thereof listed in table VIII and washed with 1 gallon of water containing such salts. The leavening activity of the treated yeast initially and after storage was tested in sweet dough.

TABLE VIII

| Sample | Percent salt by weight based on volume of mash Propagation | Wash | Rise Time (min.) Initial Activity | Activity after Storage |
|---|---|---|---|---|
| Control | none | none | 95–50–40 | 122–63–51 |
| NaCl | 0.51 | 0.51 | 75–39–33 | 113–56–49 |
| Na₂SO₄ | 0.62 | 0.62 | 78–43–35 | 105–54–46 |
| NaBr | 0.90 | 0.90 | 75–38–33 | 98–49–40 |
| Na₂CO₃ | 0.47 | 0.47 | 79–40–35 | 111–58–46 |
| Na Acetate | 1.20 | 1.20 | 67–37–32 | 97–50–45 |
| SrCl₂·6H₂O | 1.17 | 1.17 | 78–39–34 | 109–51–45 |

EXAMPLE IX

This example illustrates the effect of propagating yeast of the Bios No. 23 type with only moderate restriction of the phosphorus and nitrogen intake thereof in the presence of NaCl.

Two control samples were propagated, harvested and dried according to example I, except that they were not subjected to a salt treatment and during the propagation of one of the samples a total of 0.56 percent aqua ammonia and 0.11 percent phosphate acid were used. This resulted in one control sample having a low protein content, and the other having a high protein content. A yeast was propagated according to the present invention using a total of 0.56 percent aqua ammonia and 0.11 percent phosphoric acid to produce a yeast with a high protein content. The leavening activity of these samples was tested both in sweet and sponge dough. The results of the tests are given below in table IX.

TABLE IX

| Sample | Percent Moisture | Rise Time (min.) Sweet Dough Initial Activity | Rise Time (min.) Sponge Dough Initial Activity |
|---|---|---|---|
| Control—Low Protein | 8.4 | 79–61 | 92–55 |
| Control—High Protein | 7.7 | 92–62 | 88–53 |
| Salt treated—High Protein | 8.2 | 74–59 | 88–50 |

EXAMPLE X

This example illustrates the effect of propagating yeast of the Bios 23 type in successive stages with NaCl present.

Two propagations were performed under the conditions shown in table X using slightly different aeration rates. Another set of propagations was performed under exactly the same conditions but with 0.5 percent NaCl being present in only the last propagation stage. Yeast was harvested from

TABLE X

| Ingredients and conditions of propagation | Flask stages | | | Slightly aerobic stages | | Highly aerobic stages | |
|---|---|---|---|---|---|---|---|
| | A | B | C | D | E | F | G |
| Container size (cc.) | 300 | 1,000 | 4,000 | 15,600 | 15,600 | 15,600 | 15,600 |
| Container shape | Erlenmeyer | Erlenmeyer | Erlenmeyer | Cylinder | Cylinder | Cylinder | Cylinder |
| Water (ml.) | 100 | 300 | 1,350 | 3,400 | 4,500 | 6,000 | 3,250 |
| Molasses (ml.) | 100 | 300 | 1,350 | 385 | 481 | 642 | 642 |
| Final mash volume (ml.) | 100 | 400 | 1,750 | 5,785 | 5,320 | 6,450 | 4,400 |
| Balling of the molasses | 10.1 | 10.1 | 10.1 | 50.4 | 50.4 | 50.4 | 50.0 |
| NH₄OH [1] (percent) | 0.0111 | 0.0083 | 0.0085 | 0.0755 | 0.213 | 0.643 | 0.719 |
| H₃PO₄ [2] (percent) | 0.0127 | 0.0095 | 0.0098 | 0.0155 | 0.0281 | 0.1046 | 0.0909 |
| NaCl (g.) | 0.10 | 0.80 | 5.25 | 28.9 | 26.6 | 32.2 | 22.0 |
| NaCl (percent) | 0.1 | 0.2 | 0.3 | 0.5 | 0.5 | 0.5 | 0.5 |
| Time (hours) | 24 | 24 | 24 | 7 | 7 | 8 | 11.5 |
| Temperature | 30 | 30 | 30 | 30 | 30 | 30 | 30 |

[1] 29.5 percent (w./v.).
[2] 75 percent (w./v.).

TABLE XI

| Yeast sample | | Slightly aerobic stage | | Highly aerobic stage | |
|---|---|---|---|---|---|
| | | D | E | F | G |
| *Yeast propagated in successive stages with NaCl present* | | | | | |
| I | Aeration rate (cubic feet of air per min.) | 1.1 | 1.8 | 7.3 | 7.0 |
| | Yield of yeast (g. of 30 percent yeast solids) | 96.8 | 130.6 | 438 | 447 |
| II | Aeration rate (cubic feet of air per min.) | 1.1 | 7.3 | 7.3 | 10.5 |
| | Yield of yeast (g. of 30 percent yeast solids) | 96.6 | 166.8 | 436 | 486 |
| *Yeast propagated with NaCl being present only in the last propagation stage* | | | | | |
| III | Aeration rate (cubic feet of air per min.) | 1.1 | 1.8 | 7.3 | 7.0 |
| | Yield of yeast (g. of 30 percent yeast solids) | 98.3 | 132.8 | 459 | 491 |
| IV | Aeration rate (cubic feet of air per min.) | 1.1 | 7.3 | 7.3 | 10.5 |
| | Yield of yeast (g. of 30 percent yeast solids) | 97.8 | 173.9 | 446 | 553 |

TABLE XII

| Yeast sample | Leavening activity of the yeast in— | |
|---|---|---|
| | Sweet dough (mins.) | Sponge dough (mins.) |
| *Propagated with NaCl present in successive stages* | | |
| I | 83-41-34 | 88-58 |
| II | 83-45-37 | 91-62 |
| *Propagated with NaCl present in the last propagation stage* | | |
| III | 80-37-35 | 86-54 |
| IV | 78-41-36 | 86-56 | stages D, E, F, and G, and the yield thereof determined. The amount or yield of yeast from each of the stages is shown in Table XI. As shown in table XI, the yield obtained by propagating yeast with NaCl present in successive stages (the amount of NaCl being shown in Table X) was significantly lower than the yield of yeast obtained by having NaCl only in the last stage. Furthermore, in this example all propagation stages were seeded with the same amount of seed yeast so that if the amount of seed yeast used was proportional to the decrease in yield, where the salt was in successive stages the over all process yield of yeast would be even less than that shown.

The yeast propagated with NaCl being present in successive stages and the yeast propagated with NaCl being present in only the last stage were evaluated for leavening activity in both sweet and sponge doughs. These evaluations are shown in table XII. As seen from this table, the yeast which was propagated with salt being present only in the last stage was superior in leavening activity both in sweet and sponge doughs.

What is claimed is:

1. A method of producing an improved Baker's yeast product which comprises propagating yeast in stages and harvesting the yeast from the last stage, there being present in the last stage an effective amount of a nonnutritive ionizable salt sufficient to impart to the yeast superior leavening activity in sweet dough but insufficient to substantially lessen the amount of yeast harvested as compared to he amount of yeast harvested from propagating the yeast without the presence of salt, wherein the amount of salt present in all the propagating stages but the last stage is less than about 0.2 percent by weight based on the volume of propagation medium in the stages.

2. A method of producing an improved yeast product as defined in claim 1, wherein in all the propagating stages but the last stage there is present less than about 0.1 percent by weight nonnutritive salt based on the volume of the propagation medium in the stages.

3. A method of producing an improved yeast product as defined in claim 1, wherein the cation of the nonnutritive salt is an alkali or an alkaline earth metal.

4. A method of producing an improved yeast product as defined in claim 3, wherein the yeast propagated is of the Bios No. 23 or the Bios No. 236 type.

5. A method of producing an improved yeast product as defined in claim 4, wherein the amount of nonnutritive salt in the last propagation stage is based on the gram atomic equivalent of sodium in NaCl, the NaCl level being from about 0.3 to about 1 percent by weight based on the volume of the propagation medium.

6. A method of producing an improved yeast product as defined in claim 5, wherein the yeast propagated is of the Bios 23 type and the propagation is carried out without substantially restricting the nitrogen and phosphorus intake of the yeast and drying the yeast to produce an active dry yeast.

7. A method of producing an improved yeast product as defined in claim 6, wherein the nonnutritive salt is selected from the group consisting of NaCl, Na₂SO₄, Na acetate, NaBr, Na₂CO₃ and mixtures thereof.

8. A method of producing an improved yeast product as defined in claim 7, wherein the yeast is propagated to achieve a protein content above about 45 percent on a yeast solids basis and a phosphorus content above about 2.5 percent, calculated as P₂O₅ on the same weight basis.

* * * * *

UNITED STATES PATENT OFFICE
CERTIFICATE OF CORRECTION

Patent No. 3,617,306    Dated November 2, 1971

Inventor(s) Seymour Pomper and Emanuel Akerman

It is certified that error appears in the above-identified patent and that said Letters Patent are hereby corrected as shown below:

Column 2, line 20 after objects, second occurance, add --which--; line 74 change "sale" to --salt--.
Column 5, Table I, line 6 after 100 add degree sign (--°--); after F, second occurance, change comma (",") to period (--.--); Table II, line 57 change "Pescent" to --Percent--.
Column 7, Table VI, line 23 center heading "Rise Time (min.)" over sub-headings Initial and After Storage and underline accordingly; line 43 after yeast delete "was" ; Table VII, line 53 center heading "Rise Time (min.)" over sub-headings Initial Activity and Activity After Storage immediately below and underline accordingly; line 54 center "Activity" over After Storage immediately below.
Column 8, Table VIII, line 15 to 17 center heading "Percent salt by weight based on volume of mash" over sub-headings Propagation and Wash immediately below and underline accordingly; line 14 underline heading "Rise Time (min.)", underlining to extend the width of sub-headings immediately below.
Column 9, Table XI, line 27, change "191" to --1.1--.

Signed and sealed this 27th day of June 1972.

(SEAL)
Attest:

EDWARD M. FLETCHER, JR.          ROBERT GOTTSCHALK
Attesting Officer                Commissioner of Patents